Feb. 23, 1954     C. T. TORRESEN ET AL     2,670,021
DIE COLLAPSED ANCHOR NUT
Filed June 3, 1949
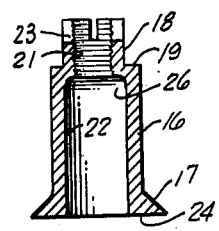
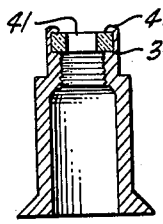
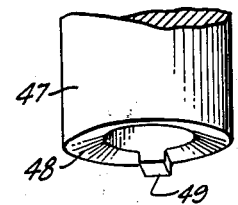
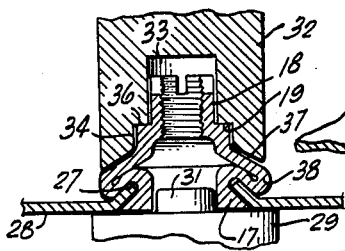
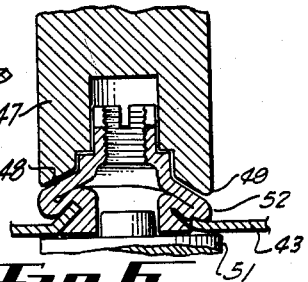
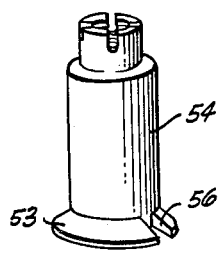
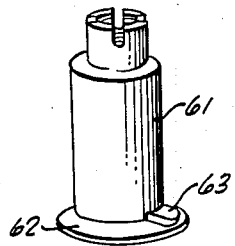
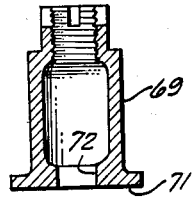
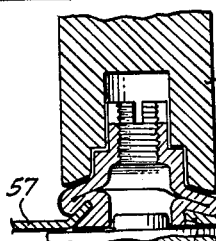
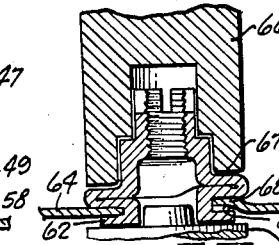
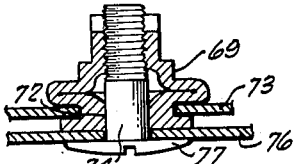
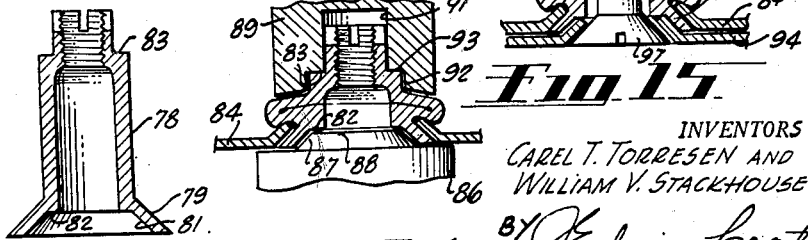
INVENTORS
CAREL T. TORRESEN AND
WILLIAM V. STACKHOUSE
BY Edwin Coates
ATTORNEY Patented Feb. 23, 1954

2,670,021

UNITED STATES PATENT OFFICE 2,670,021

DIE COLLAPSED ANCHOR NUT

Carel T. Torresen, Santa Monica, and William V. Stackhouse, Torrance, Calif.

Application June 3, 1949, Serial No. 96,954

7 Claims. (Cl. 151—41.72)

1

This invention relates to threaded fastening devices and particularly to the class of nuts generally known as anchor nuts and widely used in the aircraft industry.

Several different general types of anchor nuts have been used for some time and each has advantages and disadvantages. One type, commonly known by the trade name "Riv-Nut," comprises essentially a tubular barrel having an enlarged head at one end and an internal threaded bore at the other. To fasten it in position in an aperture in a sheet of metal, it is first inserted until the head contacts the sheet. A threaded rod is screwed into the bore from the head end. The head is then backed up while the rod is pulled rearwardly, bulging the medial portion of the barrel and gripping the sheet between the head and the bulge.

The grip of this mounting is relatively weak because only a limited force can be applied. Forces high enough to produce a satisfactory grip would result in failure of the pull-rod in tension or failure of the threads in shear. Consequently, to prevent rotation when a bolt or screw is inserted, it is usually necessary to provide the anchor nut head with a small boss serving as a detent, this boss fitting into a radial key slot in the sheet in conjunction with the aperture. This, of course, requires additional special tools, and the detent still sometimes works out of the key slot because the grip is not tight enough.

Another type, quite commonly used, comprises a nut body having one or two integral wings extending radially outwardly therefrom. Each wing has an aperture therein and the nut is anchored to a sheet by riveting the wings thereto. This type can take extremely high torques and can readily be provided with vulcanized fiber locking means. It has the disadvantage of requiring a relatively large space for installation and also requires the drilling of two rivet holes as well as the bolt hole, plus the driving of two rivets. All three holes must be carefully aligned so that the nut will register properly with the bolt hole.

The anchor nut of the present invention obviates the disadvantages mentioned above. It is generally similar to the first type described but is provided with a shoulder on the exterior of the barrel between the threaded bore and the enlarged head. With this construction it is possible to use squeezing tools to provide the bulging action and to exert enough axial pressure to produce the necessary tight squeeze between the

2 bulge and the head so that the nut can resist torque without rotation.

Since the shoulder is short of the threads, they are not distorted in the squeezing operation. If it is desired to use detent means to handle maximum torques the squeezing forces can be high enough to locally deform the mounting sheet to conform to the detent on the nut and consequently no special tools are necessary to preform a key-slot or the like in the sheet. If it is desired to use a key-slot in the sheet, the squeezing forces can be high enough to deform a portion of the nut into the slot.

The anchor nut of the present invention accomplishes a mounting as secure as that of the second type described above and takes up considerably less space by eliminating the mounting wings. It also eliminates the extra mounting holes and rivets and weighs substantially less per unit, which is of extreme importance in aircraft work, where every pound which goes into structure decreases the pay load by a pound.

Since the new anchor nut exerts a very high squeeze it can serve the dual purpose of fastening two or more structural sheets together without added weight or duplication. The first type mentioned above is not well suited to this purpose because it cannot be made tight enough, and the second type requires, of course, the use of two or more conventional rivets.

The novel anchor nut in several of its presently preferred forms, as well as the method of mounting, are illustrated in the accompanying drawing, in which:

Figure 1 is a sectional elevation of the novel anchor nut provided with a spring grip thread lock;

Figure 2 is an elevational view, partly in section, of the novel anchor nut inserted into a dimpled sheet of metal and squeezed into anchoring position by a pair of axially compressive dies;

Figure 3 is a view similar to Figure 1, showing a vulcanized fiber type of thread lock;

Figure 4 is a perspective view of a portion of a metal sheet having a dimpled aperture therein and a key slot connected with said aperture;

Figure 5 is a perspective view of an upper die member provided with special means for deforming a part of an anchor nut into the key slot of Figure 4;

Figure 6 is an elevational view, partly in section, showing an anchor nut inserted in the sheet of Figure 4 and squeezed into gripping engagement, a portion of the nut body being forced into the key slot;

Figure 7 is a perspective view of a modified form of the anchor nut with a detent forming slot in its head;

Figure 8 is an elevational view, partly in section, showing the nut of Figure 7 anchored in a sheet, a portion of the latter being forced into the detent slot of the head;

Figure 9 is a perspective view of another modified form of the nut with an upstanding detent boss on the under side of the head;

Figure 10 is an elevational view, partly in section, showing the nut of Figure 9 anchored in a sheet, a portion of the latter being deformed around the detent;

Figure 11 is a sectional elevation of a further modified form of the novel anchor nut;

Figure 12 is an elevational view, partly in section, showing the nut of Figure 11 anchored in a sheet, and a bolt attached to the nut and holding a second sheet in place;

Figure 13 is a sectional elevation of a further modified form of the novel nut;

Figure 14 is an elevational view, partly in section, showing the nut of Figure 13 inserted in a dimpled sheet and squeezed into anchoring relation by a pair of special dies; and Figure 15 is a sectional view of the joint of Figure 14 with a second dimpled sheet attached thereto by a flush screw.

The anchor nut illustrated in Figure 1 includes a tubular barrel 16 of substantially uniform diameter having at one end an enlarged head 17, here shown as conical or flush type, tho it may have any other desired form, and at the other end a portion 18 of reduced diameter producing a shoulder 19. The reduced portion has a threaded bore 21 of smaller diameter than the bore 22 of the main body and is adapted to receive a threaded bolt or other fastening. The free end of portion 18 is slotted at 23 and the sections are deformed slightly inwardly to provide a spring grip thread lock.

It will be noted that the shoulder 19 is axially aligned with the wall of barrel 16, at the opposite end of which is a flat face 24. When pressure is applied to shoulder 19 and face 24 by axially directed coacting dies, the bursting force tends to swell out the medial portion of the barrel. To insure that no deformation occurs in the threaded portion the nut is so formed that the wall at point 26 is thicker than the wall of the barrel.

To practice the invention, the nut is inserted in a dimpled aperture 27 in a sheet 28 of aluminum alloy or other suitable material. While the sheet is shown thruout the drawings as being relatively thin, the novel anchor nut is capable of use with any of the sheets or plates used in aircraft construction and the term "sheet" is used generically herein. The nut is supported in place by a die 29 having a pilot pin 31, and a second die 32 having a bore 33 and a counterbore 34, providing between them a shoulder 36, is applied to the upper end of the nut. Shoulder 36 engages shoulder 19 of the nut and the bore 33 provides axial clearance for the portion 18. The lower free end of the die is belled out at 37. The dies are, of course, mounted in a squeezer of any known type and in operation they are moved axially toward each other with great force to collapse the nut barrel 16 axially and expand or bulge it radially, the bell mouth 37 forcing the bulge 38 downwardly in conical fashion against the opposed face of the dimple to anchor the nut securely in the sheet. The permanent axial compressive force is sufficient to resist low and medium torques. It will be apparent that the nut as just described will readily join two or more sheets in a permanent and satisfactory manner.

The nut shown in Figure 3 is substantially identical in construction and operation to that of Figure 1 but the upper portion 39 is recessed to receive a vulcanized fiber ring 41 and is peened over at 42 to hold the ring in place to provide an elastic thread lock.

In the event that the anchorage of the nut is to be subjected to relatively high torques several forms of positive detent means are contemplated. The sheet of metal 43 in Figure 4 is provided with a dimpled aperture 44 having a key slot 46 extending radially outward therefrom. The nut of Figure 1 is inserted in the aperture and a special die 47 shown in Figure 5 is used to provide the locking effect. This die is provided, on its lower face 48 with a narrow, axially projecting and radially extending boss 49 of approximately the same width as slot 46.

When the nut is assembled in the sheet and placed on lower die 51, the upper die is placed over the free end of the nut and axial force is applied as previously described, with the boss 49 in alignment with slot 46. As the barrel becomes fully collapsed the boss 49 pushes a portion 52 of the bulge into slot 46 to provide a positive interlock preventing any rotation in the jointure.

The use of a key slot such as 46 requires a special notching tool to be used separately in making every jointure. To obviate the need for the special tool, detent forming means are provided in the head 53 of the nut 54 shown in Figure 7. This detent takes the form of a radial slot or saw cut 56. This nut is assembled with dimpled, apertured sheet 57 and the dies 47 and 51 are applied to the assembly in the same manner as in Figure 6. As illustrated in Figure 8, the boss 49 will depress a portion of the bulge 58 which, in turn, will force a portion 59 of the sheet down into slot 56 and produce a permanent, rotation-proof anchorage.

Instead of using a slotted head the nut 61 of Figure 9 has a head 62 on the inner face of which is formed an axially protruding radially extending detent boss 63. The head in this case is shown as flat although the type of head is a matter of choice. This nut is assembled with an apertured sheet 64 and placed on lower die 51. An upper die 66, of the same general type as the previous ones but provided with a radially extending depression 67 is placed on the upper end of the nut and squeezing pressure is applied. The majority of the bulge is forced down against the flat portion of the head 62, but the portion 68 of the sheet is deformed upwardly around the boss 63, at the same time deforming a part of the bulge upwardly into recess 67, to produce a torque-resisting, interlocking configuration.

The type of nut so far described provides a generally satisfactory connection for an attachment bolt. However, in some instances it is desired to provide bearing support for a bolt adjacent to the surface of the sheet to which the anchor nut is attached. A modification which accomplishes this result is illustrated in Figure 11 in which the nut body 69 is similar in all respects to the nut of Figure 1 except that the bore at the head end 71 is decreased at 72 to a diameter corresponding to the shank diameter of the bolt to be used therewith. As seen in Figure 12 the nut is anchored in sheet 73, and bolt 74 is snugly received therein, holding an additional sheet 76 in place by means of head 77. Since the bolt is firmly supported adjacent both of its ends, there will be no lateral shifting of the sheets with respect to each other. It will be obvious that this feature may be applied to all forms of the invention disclosed herein.

The nut 78, shown in Figure 13, is particularly suited to installations in which it is desired to attach an outer sheet to an inner sheet and maintain a smooth, flush outer surface. The nut has a conical head 79 with a conical counterbore 81 terminating in an annular flat seat 82 directly axially opposed to shoulder 83. When the nut is assembled with sheet 84 it is mounted on lower die 86, Figure 14, which has a tapered pilot pin 87 with a flat upper surface 88 of such diameter as to provide direct contact with seat 82 and axial opposition to compression loads on shoulder 83. The die 89, having a bore 91 and counterbore 92 forming seat 93, is placed over the upper end of nut 78 and compression loads applied as in the previous instances. Since the seats 88 and 93 are directly opposed there is no force applied to head 79 to distort it from its desired shape.

When the jointure is completed there is provided a threaded aperture with a conical counterbore. Consequently, as seen in Figure 15, a second dimpled sheet 94 may be laid snugly against sheet 84 and held in place by bolt 96 having a flush head 97, providing the smooth contour needed for aerodynamic installations.

In all forms of the invention the internal threading of the nut is substantially confined to the reduced portion beyond the compression shoulder. Hence the distorting forces will have no effect on it. The threads are further protected against any possible distortion by the thickened portion indicated at 26 in Figure 1. Moreover, the counterbore in the upper die also assists in maintaining the shape of the upper end of the barrel during the compression operation.

If it is desired to use the nut in installations requiring a fluid tight connection it can be formed with the upper, or reduced, end closed although the locking feature will have to be sacrificed.

While the presently preferred forms of the invention have been illustrated and described in detail, it will be apparent to those skilled in the art that various changes and modifications may be made in the construction and method of application without departing from the spirit of the invention and it is intended that all such changes and modifications shall be embraced within the scope of the following claims.

We claim:

1. An anchor nut comprising: a generally cylindrical barrel having substantially uniform internal and external diameters thruout the major portion of its length; said barrel having a smooth cylindrical bore throughout said major portion, an enlarged head formed adjacent one end thereof; the opposite end of said barrel being of reduced external diameter to form a shoulder engageable by a force-applying tool; said portion of reduced diameter having a threaded bore of smaller diameter than the bore of the intermediate portion of said barrel; said intermediate portion of said barrel having a greater cross-sectional area than said portion of reduced diameter, producing substantially greater resistance to axial compression failure and radial collapse than said portion of reduced diameter.

2. An anchor nut comprising: a generally cylindrical barrel portion having a substantially uniform external diameter; an enlarged head at one end of said barrel portion; a second cylindrical portion extending axially from the opposite end of said barrel portion and having an external diameter less than that of said barrel portion to provide an external shoulder engageable by a force-applying tool; said second portion having an internal threaded bore of less diameter than the bore of said barrel portion extending slightly beyond said shoulder toward said head to produce a transition section of greater cross-sectional area than that of either the first or second cylindrical portions; whereby axial compression pressure applied to said shoulder will produce a bulge intermediate the length of said barrel portion without distorting the threaded bore.

3. An anchor nut comprising: a first generally cylindrical, barrel portion having substantially uniform internal and external diameters thruout its length; an enlarged head at one end of said barrel portion; a second barrel portion in continuation of said first barrel portion having substantially the same external diameter and having a substantially smaller inner diameter; a third barrel portion in continuation of said second barrel portion having a smaller external diameter than said second barrel portion to form an external shoulder engageable by a force-applying tool and having an internal diameter substantially equal to that of said second barrel portion; and an internal thread formed in said second and third barrel portions; said first barrel portion having a greater cross-sectional area than said third barrel portion; and said second barrel portion having a greater cross-sectional area than said first barrel portion.

4. An anchor nut as claimed in claim 3; said third barrel portion being provided with thread locking means at its outermost free end.

5. An anchor nut as claimed in claim 3; said enlarged head portion having a bore of smaller diameter than the inside diameter of said first barrel portion to serve as a bearing for the shank of a threaded member inserted in the second and third barrel portions.

6. An anchor nut as claimed in claim 3, said enlarged head portion having a flared outer wall to seat in a conical depression in a structural member and having a frusto-conical countersink formed therein to receive a complementary portion of another structural member.

7. An anchor nut comprising: a first, generally cylindrical, barrel portion having substantially uniform internal and external diameters thruout its length; an enlarged head at one end of said barrel portion; a second barrel portion in continuation of said first barrel portion having substantially the same external diameter and having a substantially smaller inner diameter; a third barrel portion in continuation of said second barrel portion having a smaller external diameter than said second barrel portion to form an external shoulder engageable by a force-applying tool and having an internal diameter substantially equal to that of said second barrel portion; and an internal thread formed in said third barrel portion; said first barrel portion having a greater cross-sectional area than said third barrel portion; and said second barrel portion having a greater cross-sectional area than said first barrel portion.

CAREL T. TORRESEN.
WILLIAM V. STACKHOUSE.

References Cited in the file of this patent

UNITED STATES PATENTS

| Number | Name | Date |
|---|---|---|
| 1,190,803 | Rosenfeld | July 11, 1916 |
| 1,249,948 | Gruber | Dec. 11, 1917 |
| 2,017,421 | Post | Oct. 15, 1935 |
| 2,030,170 | Huck | Feb. 11, 1936 |
| 2,144,701 | Campbell et al. | Jan. 24, 1939 |
| 2,146,461 | Bettington | Feb. 7, 1939 |
| 2,148,977 | Buck | Feb. 28, 1939 |
| 2,149,199 | Waner | Feb. 28, 1939 |
| 2,188,422 | Waner | Jan. 30, 1940 |
| 2,319,376 | Wallace | May 18, 1943 |
| 2,392,133 | Eklund | Jan. 1, 1946 |
| 2,409,352 | Gill | Oct. 15, 1946 |
| 2,466,811 | Huck | Apr. 12, 1949 |
| 2,562,336 | Selden | July 31, 1951 |

FOREIGN PATENTS

| Number | Country | Date |
|---|---|---|
| 436,706 | Great Britain | Oct. 16, 1935 |
| 449,370 | Great Britain | June 25, 1936 |
| 536,553 | Great Britain | May 19, 1941 |